United States Patent
Venter et al.

(10) Patent No.: US 10,539,447 B2
(45) Date of Patent: Jan. 21, 2020

(54) STRUCTURAL UNIT FOR ARRANGEMENT AT A HYDRAULIC FLUID TANK OF A JET ENGINE

(71) Applicant: Rolls-Royce Deutschland Ltd & Co KG, Blankenfelde-Mahlow (DE)

(72) Inventors: Gideon Venter, Berlin (DE); Andre Kalms, Teltow (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 155 days.

(21) Appl. No.: 15/819,479

(22) Filed: Nov. 21, 2017

(65) Prior Publication Data

US 2018/0143060 A1 May 24, 2018

(30) Foreign Application Priority Data

Nov. 23, 2016 (DE) .................. 10 2016 122 582

(51) Int. Cl.
*G01F 23/02* (2006.01)
*F02C 7/06* (2006.01)
(Continued)

(52) U.S. Cl.
CPC ............... *G01F 23/02* (2013.01); *F02C 7/06* (2013.01); *G01F 23/26* (2013.01); *F02C 7/12* (2013.01);
(Continued)

(58) Field of Classification Search
None
See application file for complete search history.

(56) References Cited

U.S. PATENT DOCUMENTS 2,212,490 A * 8/1940 Adler, Jr. ................ B64C 11/00
244/53 R
3,125,882 A * 3/1964 Johnson et al. ...... G01P 13/008
73/331
(Continued)

FOREIGN PATENT DOCUMENTS

DE 102014102776 A1 9/2015
DE 102014113128 A1 3/2016
(Continued)

OTHER PUBLICATIONS

European Search Report dated Apr. 19, 2018 from counterpart European Patent App No. 17202507.4.
(Continued)

*Primary Examiner* — Paul M. West
*Assistant Examiner* — Mark A Shabman
(74) *Attorney, Agent, or Firm* — Shuttleworth & Ingersoll, PLC; Timothy Klima

(57) ABSTRACT

A structural unit for arrangement at a hydraulic fluid tank of a jet engine that is embodied with an outlet appliance for draining hydraulic fluid. When the structural unit is arranged at a hydraulic fluid tank, the outlet appliance has an outlet opening that is facing towards the hydraulic fluid tank. The structural unit is further embodied with at least one measuring appliance, by means of which a filling level of a hydraulic fluid that is present inside the hydraulic fluid tank can be determined when the structural unit is arranged at a hydraulic fluid tank. A fixture appliance is provided for fixedly attaching the structural unit at a hydraulic fluid tank.

14 Claims, 3 Drawing Sheets

(51) Int. Cl.
*G01F 23/26* (2006.01)
*F02C 7/12* (2006.01)
*G01F 25/00* (2006.01)

(52) U.S. Cl.
CPC .... *F05D 2220/323* (2013.01); *F05D 2260/98* (2013.01); *G01F 25/0061* (2013.01)

(56) References Cited

U.S. PATENT DOCUMENTS

| | | | | | |
|---|---|---|---|---|---|
| 4,064,911 | A | * | 12/1977 | Albrecht | F15B 1/103 138/30 |
| 4,074,752 | A | * | 2/1978 | Schlosberg | F01M 5/002 165/104.19 |
| 4,440,022 | A | * | 4/1984 | Masom | G01F 23/2922 250/577 |
| 5,713,241 | A | * | 2/1998 | Lamb | G01F 23/02 73/323 |
| 6,276,901 | B1 | * | 8/2001 | Farr | F04B 39/0207 340/619 |
| 6,571,562 | B2 | * | 6/2003 | Wilcox | F01M 11/04 244/129.1 |
| 9,631,967 | B2 | | 4/2017 | Venter | |
| 2004/0083809 | A1 | * | 5/2004 | Wech | G01F 23/02 73/323 |
| 2006/0254274 | A1 | * | 11/2006 | Kapich | F02B 33/40 60/612 |
| 2009/0101230 | A1 | * | 4/2009 | Anstead | F01D 25/00 141/326 |
| 2011/0314830 | A1 | | 12/2011 | Legare | |
| 2013/0068562 | A1 | | 3/2013 | Cornet | |
| 2015/0114109 | A1 | * | 4/2015 | Wech | G01F 23/02 73/323 |
| 2015/0260563 | A1 | * | 9/2015 | Venter | G01F 23/26 73/304 C |
| 2016/0076399 | A1 | | 3/2016 | Beier et al. | |

FOREIGN PATENT DOCUMENTS

| | | |
|---|---|---|
| DE | 102014119074 A1 | 6/2016 |
| GB | 2453837 A | 4/2009 |
| JP | H0711914 B2 | 1/1995 |

OTHER PUBLICATIONS

German Search Report dated Jul. 6, 2017 for counterpart German Application No. DE 10 2016 122 582.7.

* cited by examiner

STRUCTURAL UNIT FOR ARRANGEMENT AT A HYDRAULIC FLUID TANK OF A JET ENGINE

This application claims priority to German Patent Application DE102016122582.7 filed Nov. 23, 2016, the entirety of which is incorporated by reference herein.

The invention relates to a structural unit for arrangement at a hydraulic fluid tank of a jet engine with at least one outlet appliance and a measuring appliance according to kind as it is more closely defined herein.

Jet engines, in which an oil circuit having an oil tank is provided for providing an oil supply in particular to an auxiliary unit gearing appliance and engine bearings, are well known. To be able to top up a possibly undesirably low oil level inside the oil tank in an automated manner when the jet engine is turned off, oil can be supplied to the oil tank from a further oil tank mounted at the aircraft by means of a pump in reaction to a cockpit-side request. At that, an intake valve is provided in the area of a supply to the oil tank, which is transferred into an open operational state when an oil pressure that is conveyed by the pump in the direction of the oil tank exerts a force on the intake valve that exceeds a defined force. The oil tank is filled by the pump in an automated manner until a measuring appliance detects a desired filling level inside the oil tank. To avoid an overfilling of the oil tank, an outlet appliance with an outlet opening that can be closed with an outlet valve is additionally arranged at known oil tanks. Via the outlet valve that is embodied as an overflow valve, oil is drained from the oil tank if a defined oil level is exceeded and the outlet valve is open.

In order to make optimal use of the volume of the oil tank and be able to provide an advantageously small oil tank, a precise calibration of the outlet appliance with the outlet opening and the measuring appliance is necessary. In the case that the outlet opening is arranged too low in the vertical direction, it may for example occur that the measuring appliance detects an oil level that allows for further filling of the oil tank with oil, with oil being already drained from the oil tank via the overflow valve in an undesired manner. In an extreme case, this may lead to a complete draining of the further oil tank. In contrast, if the outlet opening is arranged undesirably high in vertical direction, a maximum oil volume inside the oil tank as limited by the outlet device is disadvantageously high, with corresponding effects on the total weight.

In known embodiments, the outlet opening of the outlet appliance and the measuring appliance are arranged at the oil tank so as to be offset with respect to one another. If the oil tank is inclined with respect to a horizontal line, for example due to a tilting of the jet engine and/or due to a tilting of the underground on which an aircraft with a jet engine comprising the oil tank rests, that makes filling the oil tank to the desired degree even more difficult. As a result, strict tolerance requirements with respect to an oil filling level to be achieved may not be possible to fulfill.

In known embodiments, a calibration of the measuring appliance as well as a positioning of the outlet opening is to be respectively performed at the oil tank following mounting, wherein the calibration of the measuring appliance as well as the positioning of the outlet opening is disadvantageously laborious.

The present invention is based on the objective of creating a device by means of which mounting of a measuring appliance and an outlet appliance at an oil tank as well as a calibration or positioning of the measuring appliance or the outlet appliance is facilitated.

According to the invention, this objective is achieved through a structural unit with features as disclosed herein.

The structural unit according to the invention for arrangement at a hydraulic fluid tank of a jet engine is embodied with an outlet appliance for draining hydraulic fluid, wherein, when the structural unit is arranged at a hydraulic fluid tank, the outlet appliance has an outlet opening that is facing towards the hydraulic fluid tank and at least one measuring appliance, wherein, when the structural unit is arranged at a hydraulic fluid tank, a filling level of a hydraulic fluid that is present inside the hydraulic fluid tank can be determined by means of the measuring appliance, and wherein a fixture appliance is provided for fixedly attaching the structural unit at the hydraulic fluid tank.

The structural unit according to the invention has the advantage that, due to the combined arrangement of the outlet opening of the outlet appliance as well as the at least one measuring appliance inside the structural unit, a calibration or positioning of the outlet opening and the at least one measuring appliance can be performed already before mounting at a hydraulic fluid tank, for example at a measuring station, and the calibrated structural unit can subsequently be mounted at a hydraulic tank. A calibration or positioning of the outlet opening and the at least one measuring appliance following mounting of the structural unit at a hydraulic fluid tank can be foregone in this way, or can be carried out in a simplified manner.

Thanks to integral embodiment inside a structural unit the according to the invention, the outlet opening and the at least one measuring appliance can further be arranged very close to each other as compared to known embodiments, in which the outlet opening and the measuring appliance are arranged separately at a hydraulic fluid tank, so that even if a hydraulic fluid tank that is provided with a structural unit according to the invention is tilted into an inclined position with respect to a horizontal orientation, a hydraulic fluid level inside in the hydraulic fluid tank can be precisely determined or set. Thus, narrow tolerances with respect to the hydraulic fluid level to be achieved in the hydraulic fluid tank can be easily observed in an advantageous manner. In addition, the danger of an oil leakage is reduced.

A further advantage of the structural unit embodied according to the invention is that the outlet opening and the at least one measuring appliance can be arranged at a hydraulic fluid tank together in a single work step by means of the fixture appliance. The mounting time and mounting costs are thus reduced with respect to a known embodiment, in which an outlet opening and a measuring appliance are to be arranged at a hydraulic fluid tank independently of each other. Further, a replacement of the structural unit can be carried out in a very simple manner, as well.

In addition, a hydraulic fluid tank with which the structural unit is to be brought into operative connection can be embodied in a simplified manner as compared to known solutions, since only one single interface for arranging the outlet opening and the at least one measuring appliance has to be provided. Accordingly, such a hydraulic fluid tank can be embodied to be lighter and more cost-effective than known hydraulic fluid tanks.

In an advantageous embodiment of the structural unit according to the invention, at least one intake appliance is provided via which, when the structural unit is arranged at a hydraulic fluid tank, the hydraulic fluid tank can be supplied with hydraulic fluid. Due to the integral embodiment of the at least one intake appliance with the structural unit, the at least one intake appliance can be mounted at a hydraulic fluid tank together with the structural unit, and a separate interface for the at least one intake appliance can be foregone.

In an advantageous embodiment of the invention, an intake valve appliance is provided, wherein hydraulic fluid can be supplied to the hydraulic fluid tank via the intake appliance in the opened operational state of the intake valve appliance in a constructionally simple manner as well as independently of the operational state.

If the intake valve appliance has a spring appliance applying a spring force to the intake valve appliance in the direction of a closed operational state, and with the structural unit being mounted, a hydraulic fluid tank can be filled with a hydraulic fluid in an automated manner for example via a pump appliance, wherein the intake valve appliance is transferred into an open operational state if a supply pressure of the hydraulic fluid has a force that exceeds the spring force. Otherwise, the intake valve appliance is safely supported by means of the spring appliance in the closed position, so that any draining of hydraulic fluid from the hydraulic fluid tank via the intake appliance it is reliably avoided.

In an advantageous embodiment of a structural unit according to the invention, the outlet appliance has at least one outlet valve appliance, wherein the outlet appliance can be transferred between an open operational state and a closed operational state by means of the outlet valve appliance in a constructionally simple manner as well as independently of the operational state.

To avoid overfilling of the hydraulic fluid tank in a constructionally simple manner when the structural unit is mounted, the outlet valve appliance, which is in particular embodied as an overflow valve, can be connected to the intake valve appliance via a coupling device, wherein, when the intake valve appliance is transferred into an open operational state, the outlet valve appliance can be transferred into an open operational state by the coupling device. Here, it can be provided that via the coupling device a mechanical coupling of the outlet valve appliance to the intake valve appliance is created. Alternatively, it can also be provided that the coupling device is embodied in such a manner for operating the outlet valve appliance, that, when the intake valve appliance performs an opening motion, the outlet valve appliance is also transferred into an open operational state.

In an advantageous embodiment of a structural unit according to the invention, a further outlet valve appliance is provided that is embodied with a spring appliance, wherein the spring appliance applies a spring force to the further outlet valve appliance in the direction of a closed operational state. Through the further outlet valve appliance, an overpressure protection device is created in a constructionally simple manner, so that, when the structural unit is mounted at the hydraulic fluid tank, any damage to the hydraulic fluid tank is reliably avoided by means of the further outlet valve appliance. Here, the further outlet valve appliance is in particular connected to the outlet appliance, so that hydraulic fluid can be drained from the hydraulic fluid tank via a common drain in an open operational state of the further outlet valve appliance.

Via a further coupling device, the further outlet valve appliance can be connected to the intake valve appliance and/or the outlet valve appliance, wherein, when the intake valve appliance and/or the outlet valve appliance are transferred into an open operational state, the further outlet valve appliance can be transferred by the further coupling device into an open operational state, wherein the further outlet valve appliance can be transferred into an open operational state in the closed operational state of the intake valve appliance and/or the outlet valve appliance. In this way, it is achieved in a constructionally simple manner that the overpressure protection is provided by the further outlet valve appliance only when the intake valve appliance and/or the outlet valve appliance is closed.

To be able to fill the hydraulic fluid tank manually in a simple manner as the structural unit is mounted at the hydraulic fluid tank and an aircraft is positioned in the airfield, the structural unit can have a further intake appliance, via which the hydraulic fluid tank can be filled in a mounted state of the structural unit. Here, a calibration of the further intake appliance with respect to further elements of the structural unit can advantageously be carried out already before the mounting of the structural unit at a hydraulic fluid tank. With the structural unit being mounted, the further intake appliance is preferably positioned in such a manner with respect to a vertical direction that a filling of the hydraulic fluid tank above a maximally admissible filling level is reliably avoided by means of the further intake appliance. Preferably, the further intake appliance is arranged in direct vicinity to the measuring appliance, so that a current filling level of hydraulic fluid inside the hydraulic fluid tank can be determined in a simple manner during a filling procedure of the hydraulic fluid tank.

In an advantageous embodiment of a structural unit according to the invention, a measuring appliance is embodied as a viewing appliance by means of which a filling level of a hydraulic fluid that is present inside the hydraulic fluid tank can be visually determined. The viewing appliance is in particular arranged in a position that is easily accessible during maintenance procedures, and can comprise a transparent element via which a filling level of a hydraulic fluid that is present inside the hydraulic fluid tank can be in particular directly visually determined by a user when the structural unit is connected to the hydraulic fluid tank. For this purpose, a viewing appliance that is embodied as an oil-level glass has in particular two openings that are offset with respect to one another and that, when the structural unit is connected to a hydraulic fluid tank, face towards an interior space of the hydraulic fluid tank. The openings are connected to each other in the area of the fixture appliance via a in particular ring-shaped recess, so that hydraulic fluid can flow from one opening to the other opening. In a state of the structural unit in which it is connected to a hydraulic fluid tank, hydraulic fluid can flow through the ring-shaped recess according to the principle of communicating vessels. Via the transparent or translucent element, which is in particular embodied with a synthetic material or glass and is arranged on a side of the ring-shaped recess that is facing away from the interior space of the hydraulic fluid tank, a filling level of the hydraulic fluid can be determined in a simple manner. Alternatively, the viewing appliance can also be embodied as a so-called oil level indicator, via which a user can in particular look directly into an interior space of a hydraulic fluid tank and determine a filling level of the hydraulic fluid when the structural unit is connected to the hydraulic fluid tank.

In an advantageous embodiment of the structural unit according to the invention, a measuring appliance is embodied as a sensor appliance or as an electrical filling level measuring device, via which, with the structural unit being mounted at the hydraulic fluid tank, a filling level of the hydraulic fluid inside the hydraulic fluid tank can be determined in particular in an automated manner.

The sensor appliance of the structural unit according to the invention can be connected to the fixture appliance in an articulated as well as rigid manner, so that, depending on the present application case and the desired functional principle, the sensor appliance can be arranged at a hydraulic fluid tank together with the structural unit in a simple manner and can take a desired position when the structural unit is arranged at a hydraulic fluid tank.

If the structural unit has a viewing appliance as well as a sensor appliance, by means of which a filling level of a hydraulic fluid present inside the hydraulic fluid tank can be determined independently of each other when the structural unit is arranged at a hydraulic fluid tank, they can be arranged particularly close to each other, so that a tilted position of a hydraulic fluid tank does not lead to discrepancies, or only to minor ones, between the filling levels determined by means of the viewing appliance and by means of the sensor appliances. Further, a joint calibration of the viewing appliance and the sensor appliance can be carried out in a simple manner already before the structural unit is mounted at a hydraulic fluid tank.

In an advantageous embodiment of the structural unit according to the invention, it is provided that, for determining the filling level of the hydraulic fluid, the sensor appliance is embodied as a sensor appliance that carries out measurements in an inductive, capacitive, magnetic manner, or the like.

If a longitudinal axis of the sensor appliance, which is for example embodied in a cylindrical or tubular manner, encloses an angle, preferably an acute angle, with an exterior surface that is facing away from an interior space of the hydraulic fluid tank or an interior surface of the fixture appliance that is facing towards the interior space of the hydraulic fluid tank when the structural unit is arranged at a hydraulic fluid tank, the sensor appliance can be passed through a recess of the hydraulic fluid tank in a simple manner during mounting of the structural unit at a hydraulic fluid tank and in addition be adjusted to the spatial conditions in the area of the hydraulic fluid tank if the angle is correspondingly designed. In this way, an accessibility of the oil-level glasses can additionally be ensured to the desired extent in a simple manner.

In a simple embodiment of the structural unit according to the invention, the fixture appliance is embodied as a flange.

In an advantageous embodiment of the structural unit according to the invention, the elements of the structural unit or the entire structural unit is or are made of a fireproof material at least in certain areas depending on the respectively present application case.

The structural unit according to the invention can be manufactured in a simple manner by means of a 3D printer.

The features specified in the patent claims as well as the features specified in the following exemplary embodiments of the structural unit according to the invention are suitable respectively on their own or in any desired combination with each other for furtherer developing the subject matter according to the invention.

Further advantages and advantageous embodiments of the structural unit according to the invention follow from the patent claims and from the exemplary embodiments that are described in principle in the following by referring to the drawing, wherein, with a view to clarity, the same reference signs are used for structural components having the same structure and functionality.

Herein:

Figure 1:
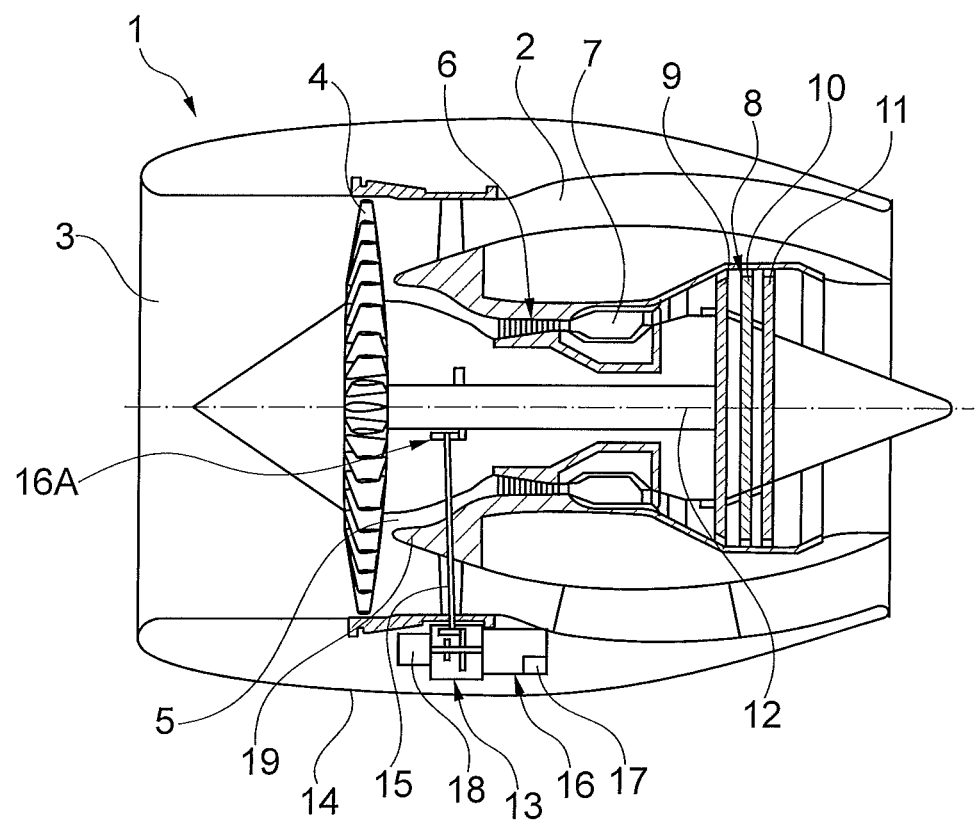
FIG. 1 shows a strongly schematized longitudinal section view of an aircraft engine with an auxiliary unit gearing appliance that is arranged in the fan housing, wherein an oil tank is associated with the auxiliary unit gearing appliance.

A turbomachine that is embodied as an aircraft gas turbine or a jet engine 1 is respectively shown in a longitudinal section view in FIG. 1a and FIG. 1b. The aircraft gas turbine 1 is configured with a by-pass channel 2 and an intake area 3, wherein a fan 4 connects to the intake area 3 downstream in a per se known manner. Downstream of the fan 4, the fluid flow in the aircraft gas turbine 1 is in turn divided into a by-pass and a core flow, wherein the by-pass flows through the by-pass channel 2 and the core flow flows into an engine core 5 or core flow channel, which is in turn embodied in a per se known manner with a compressor appliance 6, a burner 7, and a turbine appliance 8.

In the present case, the turbine appliance 8 has three rotor devices 9, 10 and 11, which are configured in a substantially comparable design and are connected tp an engine shaft 12.

In the embodiment of the jet engine 1 according to FIG. 1a, an auxiliary unit gearing appliance 13 or ancillary unit gearing appliance is arranged inside an outer engine casing 14 that delimits a by-pass channel 2 radially outside and represents the outer circumferential area of the jet engine 1. In the present case, the auxiliary unit gearing appliance 13 is connected to the engine shaft 12 via a drive shaft 15 that extends in the radial direction of the jet engine 1, and via an inner gear box 16A, and is thus driven by the engine shaft 12 and supplied with torque during operation of the jet engine 1. Different auxiliary units 16 and an oil separator 39, which is also referred to as a breather, are supplied with torque by the auxiliary unit gearing appliance 13 to a desired extent. In addition, a hydraulic fluid tank that is embodied as an oil tank 18 is provided in the area of the auxiliary unit gearing appliance 13, representing a hydraulic fluid reservoir from which oil for cooling and lubricating different areas of the jet engine 1 is extracted, such as bearing appliances, gear wheel pairs of the inner gear box 16A and the auxiliary unit gearing appliance 13, as well as further assemblies of the jet engine 1 that are to be cooled and lubricated.

Alternatively, the auxiliary unit gearing appliance 13 with the auxiliary units 16, the oil separator 17 and the oil tank 18 can also be arranged in the radial direction between the bypass channel 2 and the engine core 5 inside a structural component 19 that delimits the bypass channel 2 as well as the engine core 5.

Figure 2:
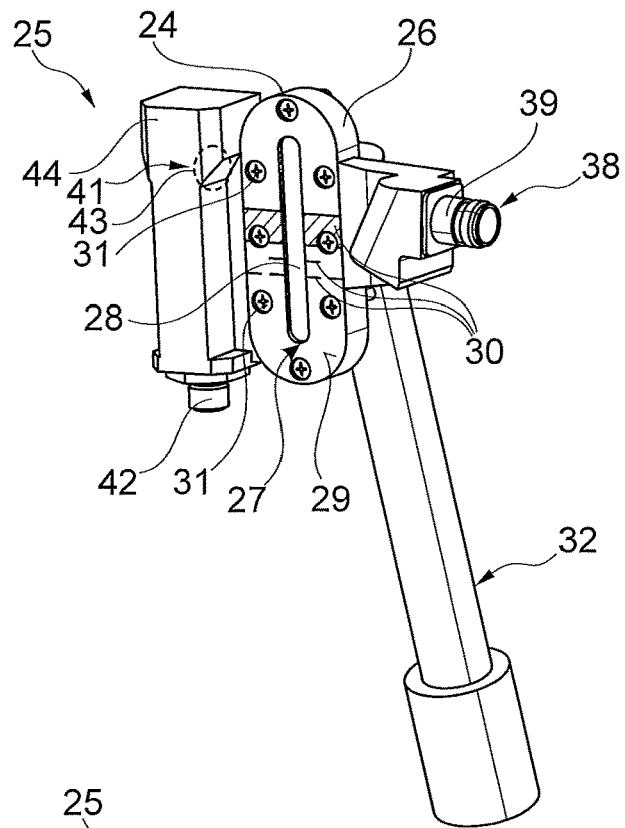
FIG. 2 shows a simplified three-dimensional rendering of a first embodiment of a structural unit that is arranged at the oil tank according to FIG. 1.
Figure 3:
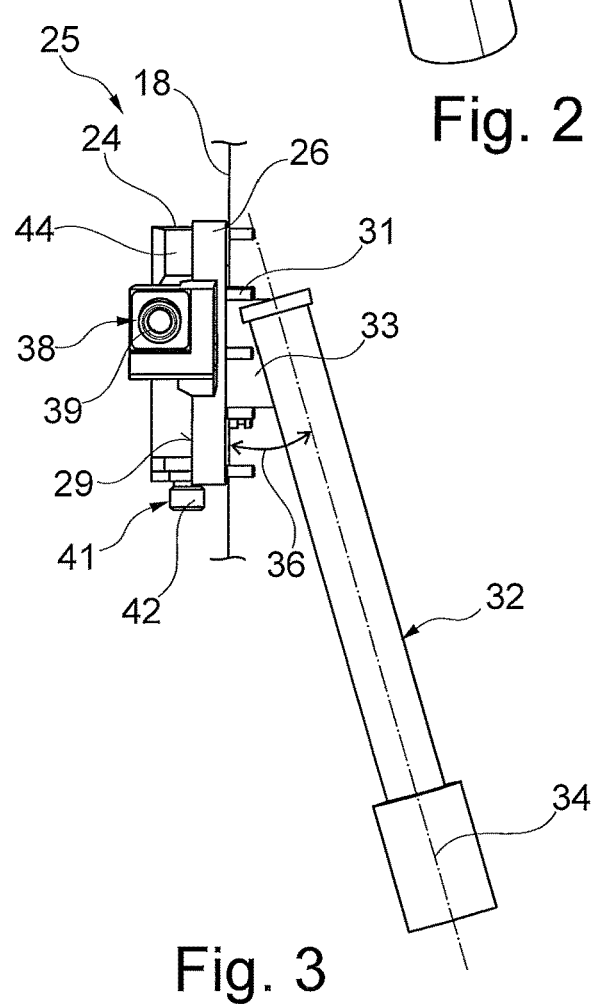
FIG. 3 shows a simplified three-dimensional rendering of the structural unit according to FIG. 2 from a different perspective.

FIG. 2 and FIG. 3 shows a first embodiment of a structural unit 25 that is embodied with a housing 24 and that can be arranged at the oil tank 18, which is shown in FIG. 3 only in sections and in a strongly simplified manner. The structural unit 25 is connected to the oil tank 18 in the area of a recess of the oil tank 18, wherein for this purpose the structural unit 25 or the housing 24 has a fixture appliance that is embodied as a flange 26. In the area of the flange 26, the structural unit 25 can be attached to a wall of the oil tank 18 in a simple manner through multiple bolts or screws 31.

The structural unit 25 has a measuring appliance that is embodied as a viewing appliance with an oil-level glass 27, wherein a user can read a filling level of a hydraulic fluid or oil present in an interior space of the oil tank 18 through the oil-level glass 27. For this purpose, the oil-level glass 27 is embodied with a transparent element 28 and is also made of a fireproof material.

In order to determine the filling level of the oil tank 1 in a particularly simple manner, markings 30 are provided next to the transparent element 28 of the oil-level glass 27 in the area of an exterior surface 29 of the flange 26 facing away from the interior space of the oil tank 18, through which a filling level of the oil can be easily read by a user.

Apart from the oil-level glass 27, the structural unit 25 has an electrical measuring appliance that is embodied as a sensor appliance 32, which is for example embodied with a float gauge or the like and is preferably provided for an automated measurement of a filling level of the oil tank 18. Through the sensor appliance 32, which in the present case is embodied in a tubular or cylindrical manner at least in certain areas, for example a so-called transducer, a filling level of the oil tank 18 can be determined by means of an inductive, capacitive or magnetic measuring principle, for example. In the present case, the sensor appliance 32 is connected to the housing 24 of the structural unit 25 in a rigid manner via a connecting sheet 33.

In the present case, a central axis 34 of the sensor appliance 32 that is embodied in a ring-shaped manner encloses an acute angle 36 with an interior surface 35 that is facing towards the interior space of the oil tank 18 or with the exterior surface 29 extending in parallel thereto and facing away from the interior space of the oil tank 18.

The oil-level glass 27 can respectively be arranged so as to be tilted in such a manner with respect to the flange 26 that the sensor appliance 32 can be inserted into the interior space of the oil tank 18 in a simple manner through the recess of the oil tank 18, wherein the sensor appliance 32 is embodied so as to be adjustable and positionable depending on the installation space that is available for the sensor appliance 32 in the mounted state.

The structural unit 25 further has an intake appliance 38 with an intake opening that is facing towards the oil tank 18 and an intake port 39, wherein oil can be supplied to the oil tank 18 from a further oil tank that is associated with an aircraft embodied with the jet engine 1, for example via a pump appliance, in the case that it is required from the cockpit-side. Depending on the filling level as determined by the sensor appliance 32, the oil tank 18 is filled with oil from the further oil tank to a desired oil level in an automated manner.

For draining oil from the oil tank 18, the structural unit 25 has an outlet appliance 41 which has an outlet opening 43 that is facing towards an interior space of the oil tank 18 and is indicated by a dashed line, as well as an outlet port 42 on a side of the structural unit 25 that is facing away from the interior space, wherein the outlet port 42 is provided for connecting to an oil draining appliance, for example in the form of a drainage pipe.

In the present case, the integrated valve appliance 44 is arranged between the intake port 39 and the intake opening of the intake appliance 38 and between the outlet opening 43 and the outlet port 42 of the outlet appliance 41, which in the present case is embodied with an intake valve appliance, an outlet valve appliance, and a further outlet valve appliance.

The intake valve appliance has a spring appliance that holds the intake valve appliance in the closed position in which oil cannot flow from the intake port 39 in the direction of the intake opening. If, for example, it is determined during an inspection that an oil level inside the oil tank 18 is undesirably low and oil has to be supplied to the oil tank 18, oil from the further oil tank is conveyed via the pump appliance in the direction of the intake port 39 of the intake appliance 38. As soon as a force acting due to the pressure that occurs during that process exceeds the spring force of the spring appliance, the intake valve appliance is transferred into an open operational state, and oil is supplied to the oil tank 18 from the further oil tank via the intake port 39 and the intake opening.

The outlet appliance 41, which represents an overflow protection device, is provided to avoid that an undesirably large amount of oil is supplied to the oil tank 18 and a maximum oil filling level is exceeded. In the opened operational state of the outlet valve appliance, oil can be drained from the oil tank 18 via the outlet opening 43 and the outlet port 42. In contrast, in the closed operational state of the outlet valve appliance, the outlet valve appliance prevents oil from flowing out of the oil tank 18.

In the present case, the outlet valve appliance is connected to the intake valve appliance in a mechanical manner via the coupling device, so that an operational state of the outlet valve appliance corresponds to an operational state of the intake valve appliance, and the outlet valve appliance has an open operational state when the intake valve appliance is in an open operational state, and has a closed operational state when the intake valve appliance is in a closed operational state. Thus, in an operational state in which no pressure is applied to the intake port 39 or in which a force from a pressure being applied to the intake valve appliance falls below the spring force of the spring appliance, oil cannot be drained from the oil tank 18 via the outlet appliance 41, and the oil tank 18 is securely closed in the area of the structural unit 25.

When the structural unit 25 is mounted, the outlet opening 43 is arranged inside the oil tank 18 in the vertical direction slightly above an oil filling level that is to be obtained during filling, so that, when necessary, oil is drained from the oil tank 18 via the outlet appliance 41 already shortly after this oil filling level has been exceeded, and an overfilling of the oil tank 18 is reliably avoided. Here, a positioning of the outlet opening 43 and a filling level inside the oil tank 18 as determined by the sensor appliance 32 and/or the oil-level glass 27 has to be exactly set or calibrated to avoid that, on the one hand, oil is for example already drained from the oil tank 18 via the outlet opening 43 before the desired filling level has been reached by the sensor appliance 32 and that, on the other hand, a maximum amount of oil inside the oil tank 18 lies only slightly above the desired filling level due to the overflow protection.

During an engine startup, oil that is present in the area bearing chambers is supplied to the oil tank 18 via a further pump appliance, which may for example be associated with the auxiliary unit gearing appliance 13, in the direction of the oil tank 18. Since the outlet valve appliance is closed during operation of the jet engine 1, a pressure inside the oil tank 18 can become undesirably high due to the oil tank 18 being filled via this pump appliance. To avoid exceeding a defined pressure limit value, in the present case the further outlet valve appliance of the valve appliance 44 is embodied as an overpressure valve with a spring appliance. The spring appliance applies a force that is acting in the direction of a closed operational state to the further outlet valve appliance.

If a force occurring due to a pressure inside the oil tank 18 and acting on the further outlet valve appliance exceeds the spring force of the spring appliance, the further outlet valve appliance is transferred into an open operational state, in which an outlet opening associated with the interior space of the oil tank 18, which can be identical to the outlet opening 43 of the outlet valve appliance, is connected to the outlet port 42, and oil can be drained from the oil tank 18 via the outlet appliance 39.

Here, it can be provided that the further outlet valve appliance is connected to the outlet valve appliance via a coupling device, wherein the further outlet valve appliance is transferred into an open operational state by the coupling device when the outlet valve appliance in an open operational state. If the outlet valve appliance is closed, the further outlet valve appliance can be transferred into an open operational state by the spring appliance.

In an alternative embodiment of the invention, the intake appliance can also be connected to the further pump appliance that is arranged in the area of the auxiliary unit gearing appliance 13, so that in an operational state in which oil is conveyed into the oil tank 18 by the further pump appliance, the outlet valve appliance is in an open operational state due to the coupling to the intake valve appliance. A further outlet valve appliance that is embodied as an overpressure valve can possibly be forgone in such an embodiment of the structural unit.

The oil-level glass 27, the sensor appliance 32 and the outlet openings 43 can be arranged very closed to each other in a structural unit according to the invention 25, so that a tilting of the oil tank 18 has no or only a minor impact on the functionality of the assembly group 25. Further, the structural unit 25 can advantageously be pre-assembled, so that a calibration of the structural unit 25 can be carried out already before the mounting of the structural unit 25 at the oil tank 18, for example on a testing bench. In addition, the structural unit 25 with only one interface can be mounted in a simple and quick manner at the oil tank 18, so that apart from the intake appliance 38 and the outlet appliance 41, also the oil-level glass 27, the sensor appliance 32, the outlet openings 43 and the valve appliance 44 can be fixedly attached at the oil tank 1 in a single work step via the flange 26. By combining the mentioned elements in a structural unit 25, tolerances during manufacture of the oil tank 18 can be easily compensated for.

Figure 4:
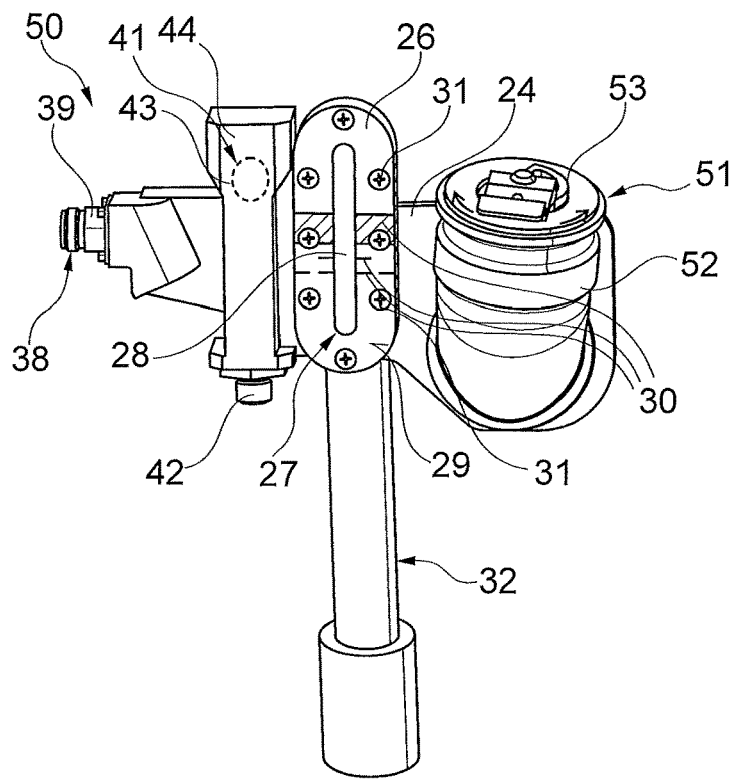
FIG. 4 shows a simplified three-dimensional rendering of a second embodiment of a structural unit that can be arranged at the oil tank according to FIG. 1.
Figure 5:
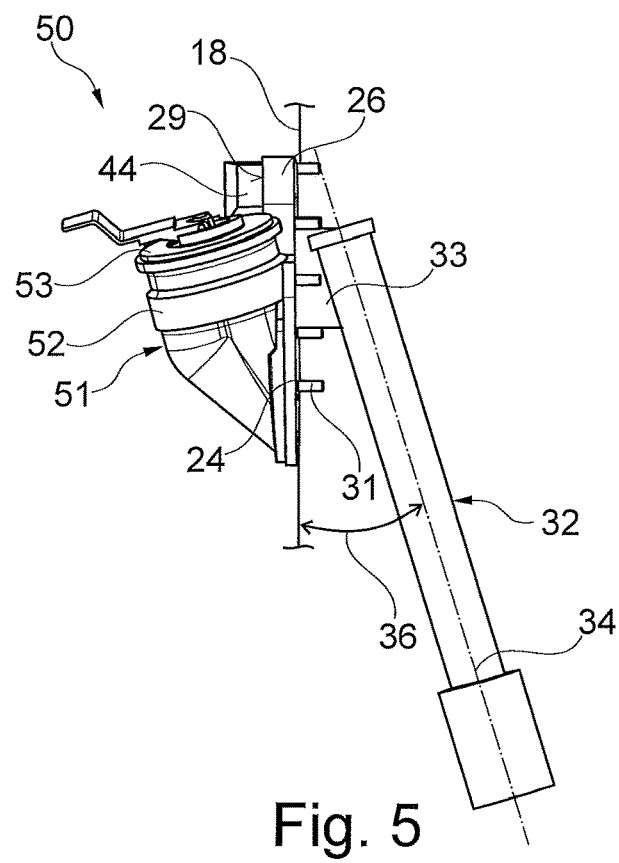
FIG. 5 shows a simplified three-dimensional rendering of the structural unit according to FIG. 4 from a different perspective.

FIG. 4 and FIG. 5 show a further embodiment of a structural unit 50. In the following, only the differences of the structural unit 50 with respect to the structural unit 25 are discussed, wherein otherwise the description regarding the structural unit 25 is referred to.

The structural unit 50 has a further intake appliance 51, by means of which the oil tank 18 can be manually filled. For this purpose, the further intake appliance 51 has a tank nozzle 52 that can be closed with a cover 53 and that is fixedly connected to the further structural components of the structural unit 50. Here, the tank nozzle 52 is arranged in such a manner with respect to its position in the vertical direction of the oil tank 18 that, when the structural unit 50 is mounted at the oil tank 18, the oil tank 18 may be filled up to a desired maximum filling level, but not more than that.

PARTS LIST

1 jet engine
2 bypass channel
3 intake area
4 fan
5 engine core
6 compressor appliance
7 burner
8 turbine appliance
9, 10, 11 rotor device
12 engine axis
13 auxiliary unit gearing appliance
14 engine casing
15 drive shaft
16 auxiliary units
16A inner gear box
17 oil separator
18 oil tank
19 structural component
24 housing
25 structural unit
26 fixture appliance; flange
27 measuring appliance; oil-level glass
28 transparent element
29 surface
30 markings
31 screws
32 measuring appliance; sensor appliance
33 connecting sheet
34 central axis
35 interior surface
36 angle
38 intake appliance
39 intake port
41 outlet appliance
42 outlet ports
43 outlet opening
44 valve appliance
50 structural unit
51 further intake appliance
52 tank nozzle
53 cover

The invention claimed is:

1. A structural unit for arrangement at a hydraulic fluid tank of a jet engine, comprising:
    an outlet appliance for draining hydraulic fluid from the hydraulic fluid tank,
    wherein, when the structural unit is arranged at the hydraulic fluid tank, the outlet appliance includes an outlet opening facing towards the hydraulic fluid tank,
    a measuring appliance by which a filling level of a hydraulic fluid that is present inside the hydraulic fluid tank can be determined when the structural unit is arranged at the hydraulic fluid tank,
    the outlet appliance with the outlet opening being positioned corresponding to a maximum level of the hydraulic fluid tank as overflow protection for the hydraulic fluid tank, the measuring appliance being calibrated to the positioning of the outlet opening,
    a fixture appliance for fixedly attaching the structural unit at the hydraulic fluid tank;
    an intake appliance integral with the structural unit, via which hydraulic fluid can be supplied to the hydraulic fluid tank when the structural unit is arranged at the hydraulic fluid tank.

2. The structural unit according to claim 1, and further comprising an intake valve appliance, wherein hydraulic fluid can be supplied to the hydraulic fluid tank via the intake appliance in an open operational state of the intake valve appliance.

3. The structural unit according to claim 2, wherein the intake valve appliance includes a spring appliance that applies a spring force to the intake valve appliance in a direction of a closed operational state of the intake valve appliance.

4. The structural unit according to claim 3, wherein the outlet appliance includes an outlet valve appliance.

5. The structural unit according to claim 4, and further comprising a coupling device connecting the outlet valve appliance to the intake valve appliance, wherein, when the intake valve appliance is transferred into the open operational state, the outlet valve appliance can be transferred into an open operational state by the coupling device.

6. The structural unit according to claim 4, and further comprising a further outlet valve appliance that includes a further spring appliance, wherein the further spring appliance applies a spring force to the further outlet valve appliance in a direction of a closed operational state.

7. The structural unit according to claim 6, and further comprising a further coupling device connecting the further outlet valve appliance to at least one chosen from the intake valve appliance and the outlet valve appliance, wherein, when the at least one chosen from the intake valve appliance and the outlet valve appliance is transferred into an open operational state, the further outlet valve appliance can be transferred into an open operational state by the further coupling device.

8. The structural unit according to claim 1, and further comprising a further intake appliance, via which the hydraulic fluid tank can be filled in a mounted state of the structural unit.

9. The structural unit according to claim 1, wherein the measuring appliance includes a viewing appliance by which a filling level of the hydraulic fluid present in the hydraulic fluid tank can be determined in a visual manner.

10. The structural unit according to claim 1, wherein the measuring appliance includes a sensor appliance.

11. The structural unit according to claim 10, wherein, for determining the filling level of the hydraulic fluid, the sensor appliance is configured for conducting measurements in an inductive, capacitive, or magnetic manner.

12. The structural unit according to claim 10, wherein, when the structural unit is arranged at the hydraulic fluid tank, a longitudinal axis of the sensor appliance encloses an angle with an exterior surface that is facing away from an interior space of the hydraulic fluid tank or an interior surface of the fixture appliance that is facing towards the interior space of the hydraulic fluid tank.

13. A structural unit for arrangement at a hydraulic fluid tank of a jet engine, comprising:
an outlet appliance for draining hydraulic fluid from the hydraulic fluid tank,
wherein, when the structural unit is arranged at the hydraulic fluid tank, the outlet appliance includes an outlet opening facing towards the hydraulic fluid tank,
a measuring appliance by which a filling level of a hydraulic fluid that is present inside the hydraulic fluid tank can be determined when the structural unit is arranged at the hydraulic fluid tank,
a fixture appliance for fixedly attaching the structural unit at the hydraulic fluid tank,
an intake appliance integral with the structural unit, via which hydraulic fluid can be supplied to the hydraulic fluid tank when the structural unit is arranged at the hydraulic fluid tank,
an intake valve appliance, wherein hydraulic fluid can be supplied to the hydraulic fluid tank via the intake appliance in an open operational state of the intake valve appliance,
wherein the outlet appliance includes an outlet valve appliance,
a coupling device connecting the outlet valve appliance to the intake valve appliance, wherein, when the intake valve appliance is transferred into the open operational state, the outlet valve appliance can be transferred into an open operational state by the coupling device.

14. A structural unit for arrangement at a hydraulic fluid tank of a jet engine, comprising:
an outlet appliance for draining hydraulic fluid from the hydraulic fluid tank,
wherein, when the structural unit is arranged at the hydraulic fluid tank, the outlet appliance includes an outlet opening facing towards the hydraulic fluid tank,
a measuring appliance by which a filling level of a hydraulic fluid that is present inside the hydraulic fluid tank can be determined when the structural unit is arranged at the hydraulic fluid tank,
a fixture appliance for fixedly attaching the structural unit at the hydraulic fluid tank,
an intake appliance integral with the structural unit, via which hydraulic fluid can be supplied to the hydraulic fluid tank when the structural unit is arranged at the hydraulic fluid tank,
an intake valve appliance, wherein hydraulic fluid can be supplied to the hydraulic fluid tank via the intake appliance in an open operational state of the intake valve appliance,
wherein the outlet appliance includes an outlet valve appliance,
a further outlet valve appliance, and
a coupling device connecting the further outlet valve appliance to at least one chosen from the intake valve appliance and the outlet valve appliance, wherein, when the at least one chosen from the intake valve appliance and the outlet valve appliance is transferred into an open operational state, the further outlet valve appliance can be transferred into an open operational state by the coupling device.

* * * * *